US012756167B2

(12) United States Patent
Knaus et al.

(10) Patent No.: US 12,756,167 B2
(45) Date of Patent: Oct. 6, 2026

(54) ADAPTOR FOR CONNECTING AND SECURING DIFFERENT HARNESS PROTECTION SYSTEMS

(71) Applicant: ABB Schweiz AG, Baden (CH)

(72) Inventors: Michael Knaus, Coventry (GB); Meirion Buck, Swadlincote (GB)

(73) Assignee: ABB Schweiz AG, Baden (CH)

( * ) Notice: Subject to any disclaimer, the term of this patent is extended or adjusted under 35 U.S.C. 154(b) by 134 days.

(21) Appl. No.: 18/602,555

(22) Filed: Mar. 12, 2024

(65) Prior Publication Data

US 2024/0313515 A1 Sep. 19, 2024

(30) Foreign Application Priority Data

Mar. 14, 2023 (EP) .................................... 23161756

(51) Int. Cl.
*H02G 3/04* (2006.01)
*B60R 16/02* (2006.01)
*H01B 7/00* (2006.01)

(52) U.S. Cl.
CPC ......... *H02G 3/0456* (2013.01); *H01B 7/0045* (2013.01); *H02G 3/0462* (2013.01); *B60R 16/0215* (2013.01)

(58) Field of Classification Search
CPC ...... H01B 7/0045; H02G 3/06; H02G 3/0462; B60R 16/0215
See application file for complete search history.

(56) References Cited

U.S. PATENT DOCUMENTS

| | | | | |
|---|---|---|---|---|
| 6,767,280 | B1 * | 7/2004 | Berger | F24F 13/0218 454/339 |
| D774,628 | S * | 12/2016 | Provenzano | D23/262 |
| 10,677,377 | B2 | 6/2020 | Sheppard et al. | |
| 11,804,700 | B2 * | 10/2023 | Takagi | H02G 3/0406 |
| 11,821,646 | B2 * | 11/2023 | Beach | F16L 33/24 |
| 2002/0135182 | A1 * | 9/2002 | Mariman | F16L 37/0985 285/308 |
| 2008/0009173 | A1 | 1/2008 | Carnahan et al. | |
| 2008/0277929 | A1 * | 11/2008 | Bucher | F16L 37/0885 285/317 |
| 2019/0123531 | A1 * | 4/2019 | Yoshimura | H02G 3/0691 |
| 2021/0218159 | A1 * | 7/2021 | Marmet | H02G 3/06 |
| 2023/0258289 | A1 * | 8/2023 | Douthitt | H02G 3/06 29/527.1 |

FOREIGN PATENT DOCUMENTS

| | | |
|---|---|---|
| EP | 3518642 B1 | 7/2022 |
| JP | 6531965 B2 | 6/2019 |

OTHER PUBLICATIONS

European Patent Office, Extended European Search Report in European Patent Application No. 23161756.4, 9 pp. (Aug. 22, 2023).

* cited by examiner

*Primary Examiner* — Paresh Paghadal
(74) *Attorney, Agent, or Firm* — Fitch Even Tabin & Flannery LLP

(57) ABSTRACT

An adaptor for connecting, adapting and securing different harness protection systems includes a main body including a first portion, the first portion being a conduit harness system interface configured to be connected to a conduit harness system, and a second portion, the second portion being a wiring harness protection system interface configured to be connected to a wiring harness protection system.

13 Claims, 7 Drawing Sheets

ADAPTOR FOR CONNECTING AND SECURING DIFFERENT HARNESS PROTECTION SYSTEMS

CROSS-REFERENCE TO RELATED APPLICATIONS

The instant application claims priority to European Patent Application No. 23161756.4, filed Mar. 14, 2024, which is incorporated herein in its entirety by reference.

FIELD OF THE DISCLOSURE

The present disclosure generally relates to an adaptor for connecting, adapting and securing different harness protection systems, a method for connecting, adapting and securing a harness protection system of a wiring harness system to a conduit harness system, a wiring harness connection system and an industrial product comprising such a wiring harness connection system, a use of a cable tie or a conduit clip for securing multiple cable protection systems such as conduit and braiding, enabling them to be used together.

BACKGROUND OF THE INVENTION

Within industry, conduit harness systems and various types of wiring harness protection systems are used for protecting cables and manufacturing of wiring harness. Since these systems are not compatible with each other, manufacturers currently need to choose between one system in one area and another for other locations with no way of linking the two systems together. There is no current dedicated method to directly connect the two systems together. Basic features are included in the conduit interfaces to loosely attach the covering system to their products.

BRIEF SUMMARY OF THE INVENTION

There may be a desire to provide a connection between different protection systems. The described embodiments similarly pertain to the adaptor, the method to connect, adapt and secure harness protection systems, the wiring harness connection system, the industrial product, and the use of a cable tie or a conduit clip for securing a wiring harness protection system. Synergetic effects may arise from different combinations of the embodiments although they might not be described in detail.

Technical terms are used by their common sense. If a specific meaning is conveyed to certain terms, definitions of terms will be given in the following in the context of which the terms are used.

According to a first aspect, an adaptor for connecting, adapting, and securing different harness protection systems is provided. The adaptor comprises a main body including a first portion, which is a conduit harness system interface configured to be connected to a conduit harness system and a second portion, which is a wiring harness protection system interface configured to be connected to a wiring harness protection system.

The adaptor assembles with conduit harness systems to link wiring harness protection systems. The adaptor is made up of two sub-systems, namely a wiring harness protection system interface and a conduit harness system interface. The conduit harness system interface is realized by the first portion of the main body for connecting the adaptor to conduit harness systems and the wiring harness protection system interface is realized by the second portion of the main body providing the ability to terminate wiring harness protection systems at the end of conduit harness systems. The main body is hollow to receive cables of the wiring harness. The adaptor may connect various wiring harness protection systems including, for example, one or more, i.e., a combination, of the following arrangements: heat shield looms, mesh-split sleeves, fiber glass heat shields, electromagnetic compatibility (EMC) braided hoses, isolation sleeves or other sleeves in general for protecting the harness from the environment or for protecting the environment from the cables, in particular from the current running through the cables, a voltage, or electromagnetic fields. The protection systems may include a single such protective arrangements or multiple such protective arrangements. The conduit harness system is per se also a protection system.

BRIEF DESCRIPTION OF THE SEVERAL VIEWS OF THE DRAWING(S)

DETAILED DESCRIPTION OF THE INVENTION

Figure 1A:
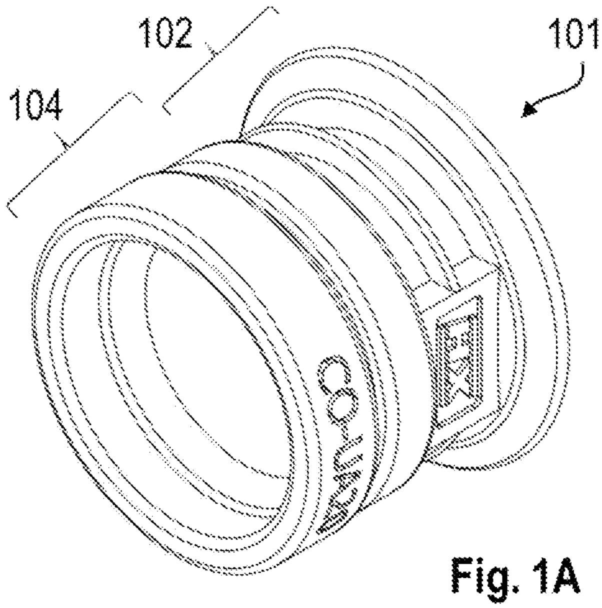
FIG. 1A is a 3D-diagram of the main body of an adaptor in accordance with the disclosure.

Corresponding parts are provided with the same reference symbols in all figures. FIG. 1A shows a 3D-diagram of the main body 101 of the adaptor 100, which is a part of the adaptor 100. The adaptor 100 comprises further a fixing device such as a cable tie 302 or a conduit clip 402 which are shown in FIGS. 3A to 4B. The main body 101 has a first portion 102, which is a wiring harness protection system interface 102 and a second portion 104, which is a conduit harness system interface 104. The structure of the main body 101 consists of cylindrical sections with different diameters as can be seen in FIGS. 1A, IC and 1D. The cylindrical sections have a common cylinder axis. The hollow interior of the cylindrical section receives the wiring harness at a first end of the main body 101 and the conduit harness system on the other end, i.e., a second end, of the main body 101. That is, the main body 101 has two openings. The first one is located at a first end of the main body 101 to receive the wiring harness, and the second one is located at a second end of the main body 101 to receive the conduit harness system or to be received by the conduit harness system. The wiring harness protection system 312 on the other hand is drawn over the first end and covers the first portion of the main body 101, as illustrated in FIGS. 4A and 4B.

Figure 1B:
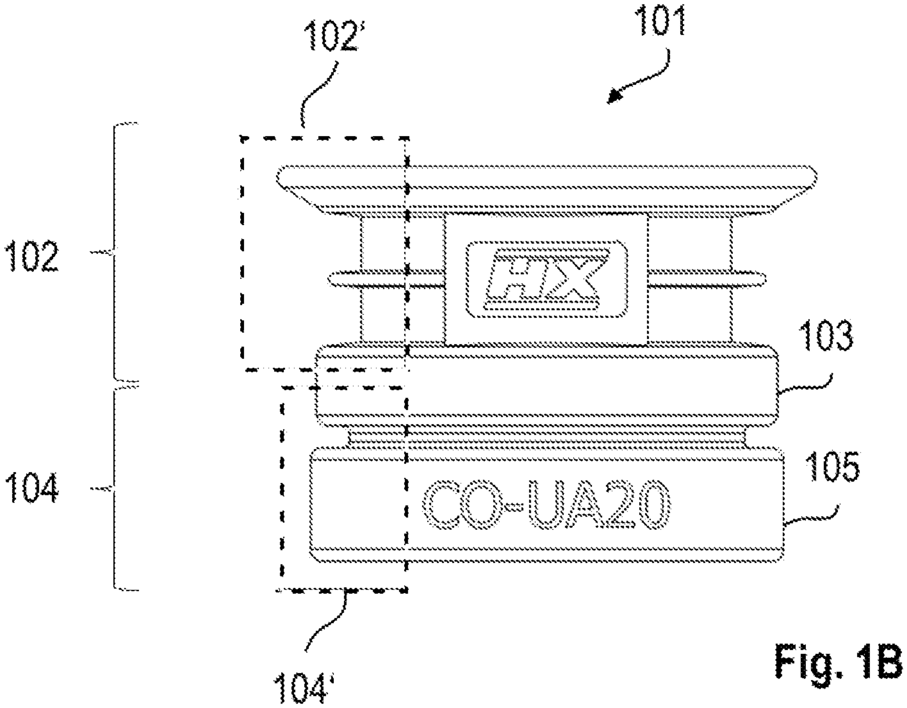
FIG. 1B is a diagram of a side view of the main body in accordance with the disclosure.
Figure 1C:
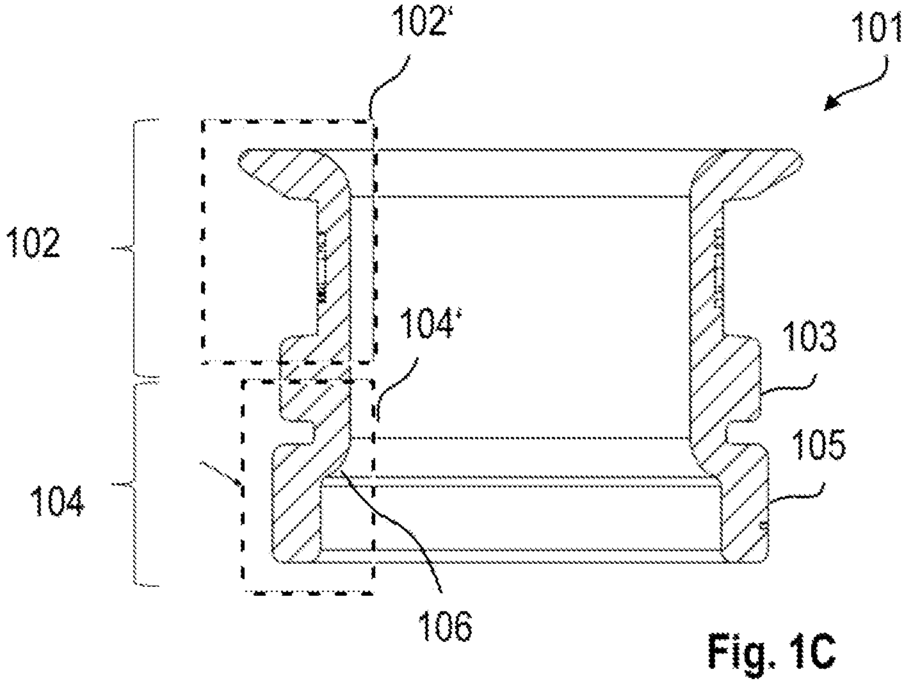
FIG. 1C is a diagram of a cut view of the main body in accordance with the disclosure.
Figure 1D:
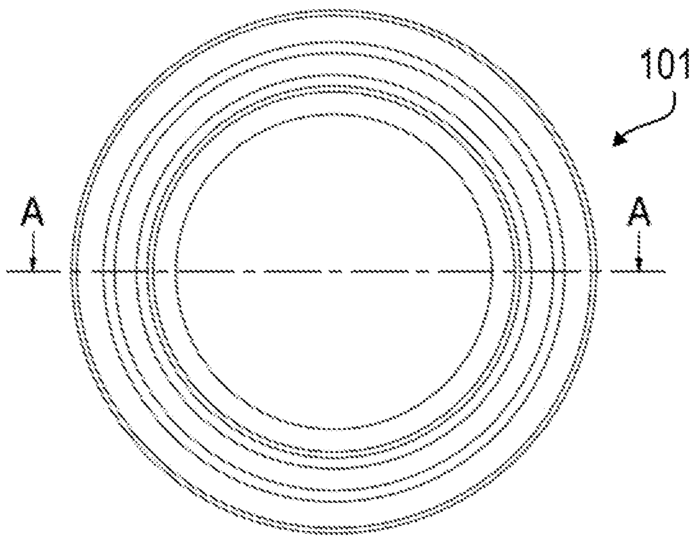
FIG. 1D is a diagram of a top view of the main body in accordance with the disclosure.

FIG. 1B shows a diagram with a side view of the main body and FIG. 1C shows a diagram with a cut view of the main body 101. In the side view of FIG. 1B, the two portions 102 and 104 can be seen as well as a common central portion 103 that connects portions 102 and 104 with each other. The parts 102' and 104' marked with a dashed rectangle in FIG. 1B correspond to the parts 102' and 104' in FIG. 1C. The thickness of the cylindrical wall differs. The inner wall has essentially two different diameters with a smooth transition 106. The inner diameter of the conduit harness system interface 104 is greater that the diameter of the wiring harness interface 102. The outer side of the wall has narrow portions or grooves that serve for fixing the wiring harness system or the conduit harness system.

Figure 2A:
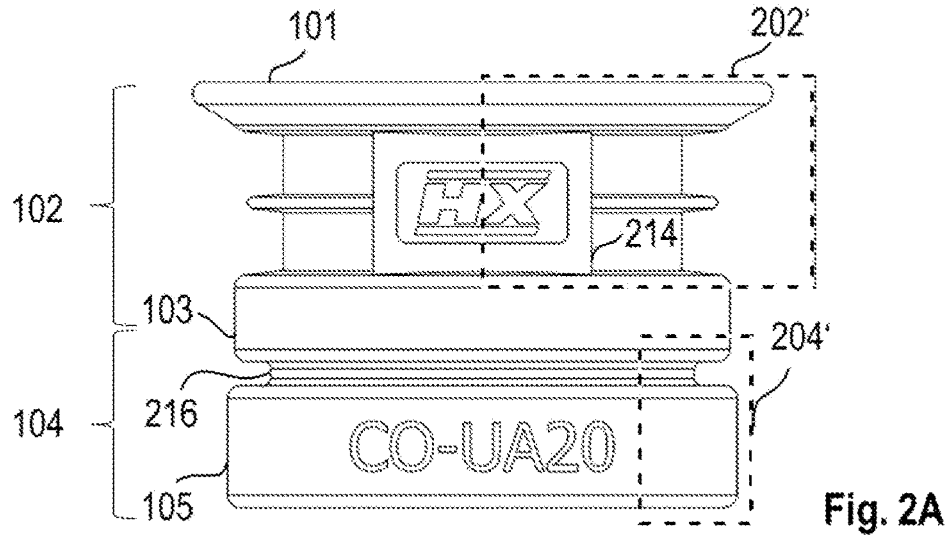
FIG. 2A is a further diagram of a side view of the main body in accordance with the disclosure.
Figure 2B:
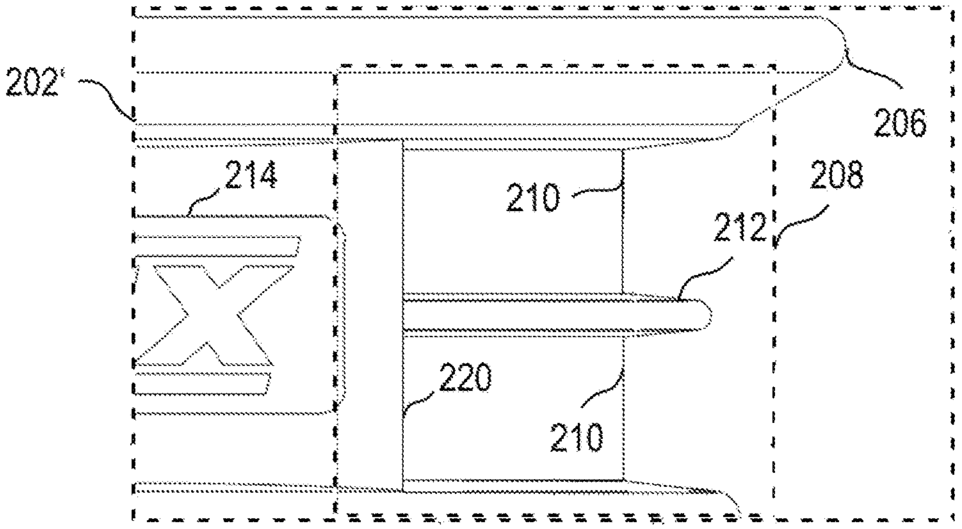
FIG. 2B is a diagram of the wiring harness protection system interface in accordance with the disclosure.
Figure 2C:
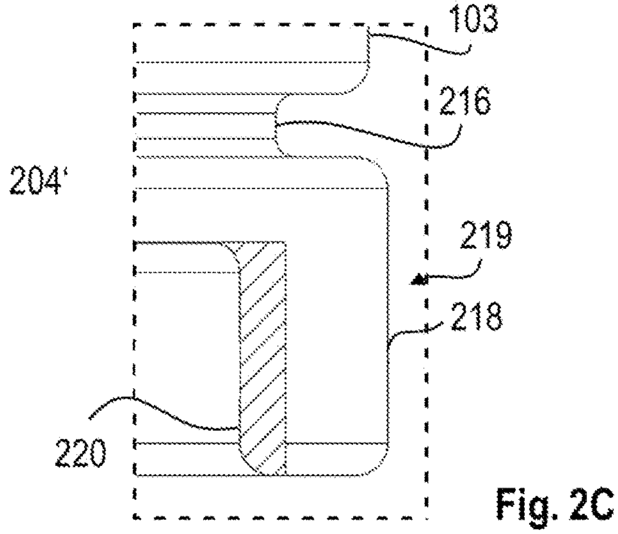
FIG. 2C is a diagram of the conduit harness system interface in accordance with the disclosure.

FIG. 2A shows a diagram of a side view of the main body similar to FIG. 1B. The part 202' is depicted in FIG. 2B in more detail and the part 204' is depicted in FIG. 2C in more detail. Further, a locating feature 214 and a securing groove 216 for attaching the conduit harness system to the main body 101 are shown. The locating feature 214 may be a location lug to align a conduit clip and may provide extra surface area for cable tie applications. The locating feature 214 covers the two grooves 210 and the rib 212 partly. It has a rectangular shape and adapts to the cylindrical shape of the main body 101. The locating feature 214 may be a separate part that is clamped into the grooves 210 and/or onto the central rib 212 between the two grooves 210, or may be integral with the main body 101.

FIG. 2B shows an enlarged diagram of a part 202' of the wiring harness protection system interface 102. The wiring harness protection system interface 102 comprises a front lip 206 to increase the tensile strength of the termination. The dual function retention system 208 uses grooves 210 in the outer surface of the wall of the wiring harness protection system interface 102 with a central rib 212 in between the grooves 210, and one or two locating features 214. The grooves 210 and the central rib 212 facilitate the use of a cable tie or a conduit clip to secure the wiring harness protection system as shown in FIGS. 3A, 3B, 4A and 4B.

FIG. 2C shows an enlarged diagram of a part 204' of the conduit harness system interface 104. The conduit harness system interface 104 contains a securing groove 216 at the outer surface of the main body 101 for securing the conduit harness system 104. The securing groove 216 is in between the common central portion 103 and the conduit harness system receiving portion 219. The conduit harness system receiving portion 219 has a smooth radial surface 218 on its outer side and a smooth internal surface 220 on its inner side, which is illustrated by the part 204' in FIG. 2C.

Figure 3A:
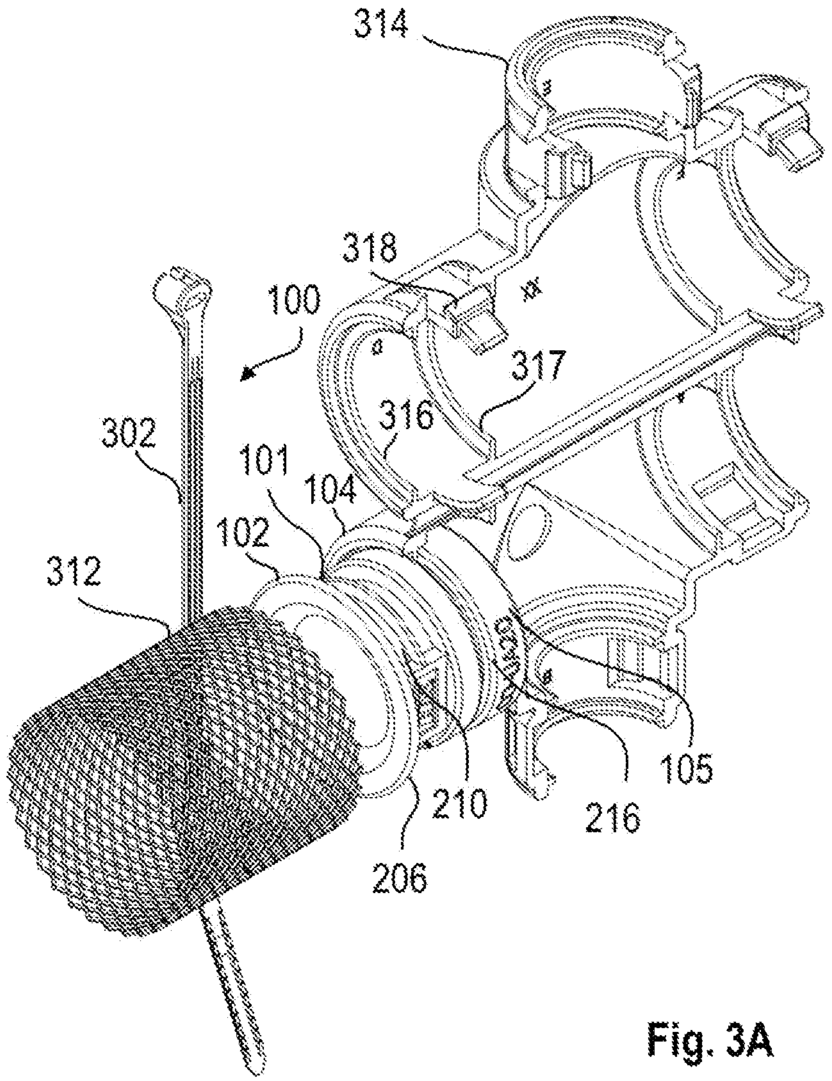
FIG. 3A is a 3-D diagram of the conduit harness system interface before assembly of the conduit harness system and the wiring harness system according to an embodiment of the present disclosure.
Figure 4A:
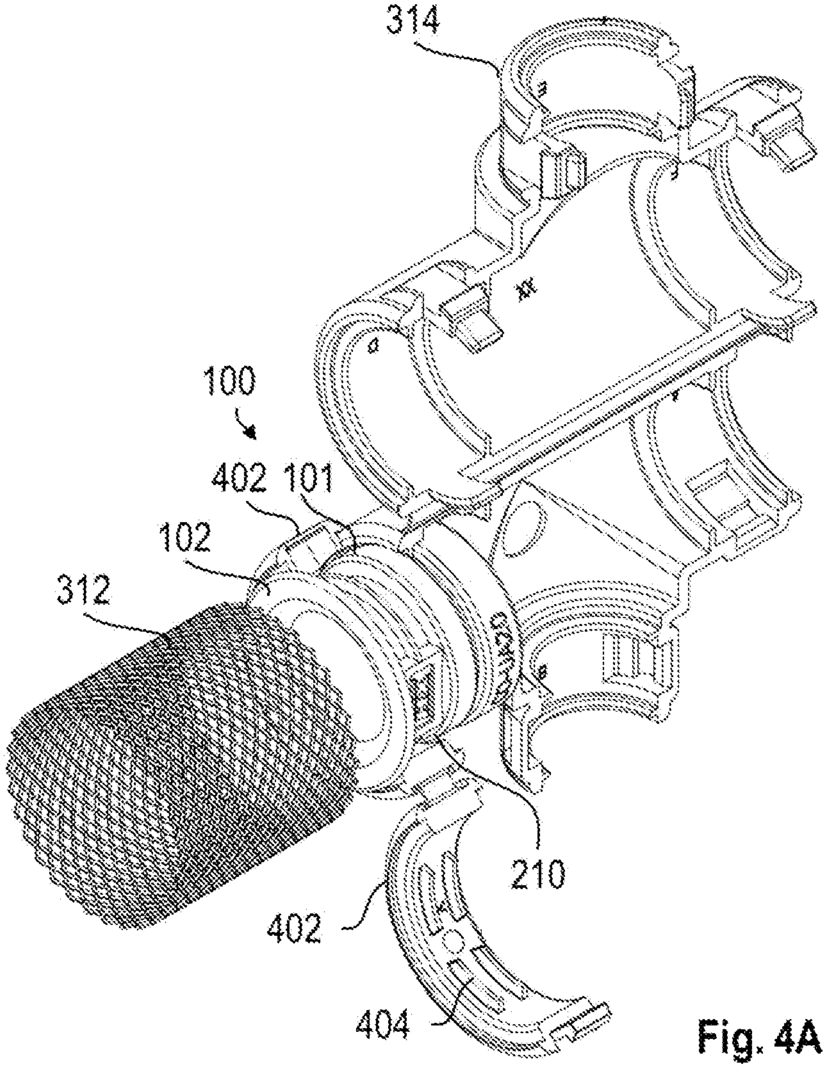
FIG. 4A is a 3-D diagram of the conduit harness system interface before assembly of the conduit harness system and the wiring harness system according to a further embodiment of the present disclosure.
Figure 4B:
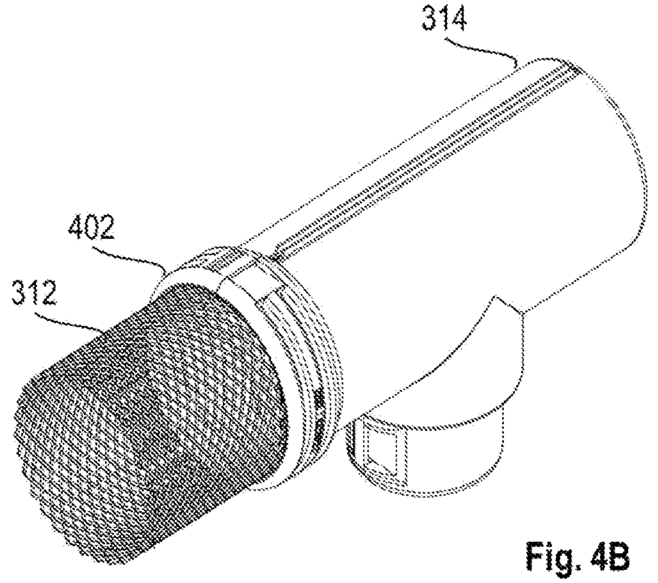
FIG. 4B is a 3-D diagram of the conduit harness system interface after assembly of the conduit harness system and the wiring harness system according to a further embodiment of the present disclosure.

FIG. 3A shows a diagram of the adaptor 100, the wiring harness protection system 312 and the conduit harness system 314. The diagram illustrates the application of the adaptor 100 using a first fixing method. The adaptor 100 depicted in FIG. 3A consists of the main body 101 and the cable tie 302.

At the first end of the adaptor 100, the wiring harness protection system 312 is drawn over the front lip 206 such that it hits the edge of the opening of the conduit harness system 314 when the conduit harness system 314 is secured to the adaptor 100. The wiring harness protection system 312 is fixed with a cable tie 302, which presses the wiring harness protection system 312 into one of the grooves 210.

At the second end of the adaptor 100, the conduit harness system 314 is attached to the conduit harness system interface 104 of the adaptor 100 but not fixed as long as the foldable conduit harness system 314 is in an unfolded state. The conduit harness system 314 has two securing ribs 316, 317. The first securing rib 316 engages with the securing groove 210. The second securing rib 317 rests on the other side of the system fixing portion 105 of the conduit harness system interface 104. When closing the foldable cover of the conduit harness system 314, the securing ribs enclose the securing groove 216 and the conduit harness system fixing portion 105 completely, and the clip mechanism 318 snaps in so that the conduit harness system 314 is securely attached to the adaptor 100.

Figure 3B:
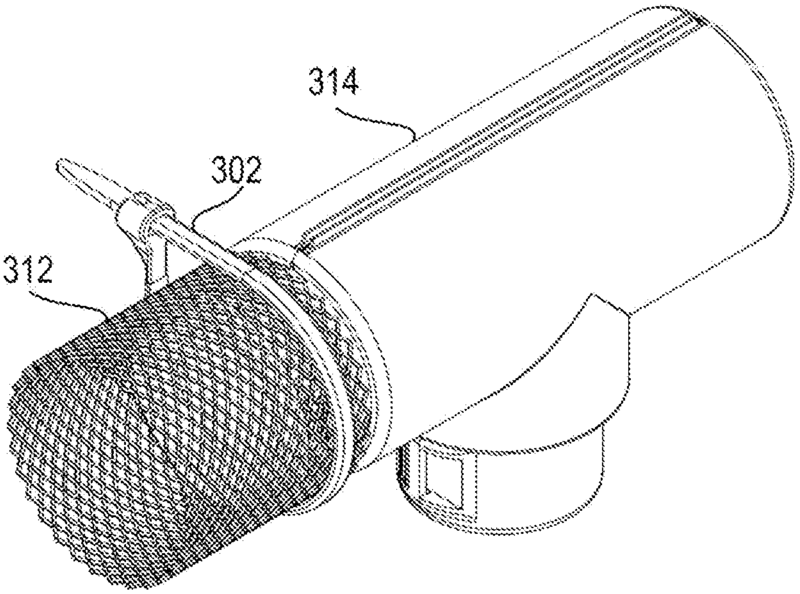
FIG. 3B is a 3-D diagram of the conduit harness system interface after assembly of the conduit harness system and the wiring harness system according to an embodiment of the present disclosure.

FIG. 3B shows the state where both, the conduit harness system 314 and the wiring harness protection system 312 are fixed to the adaptor 100.

FIG. 4A shows an alternative fixing method for fixing the wiring harness protection system 312. Instead of cable tie 302, a foldable conduit clip 402 is used. That is, the adaptor 100 depicted in FIG. 4A consists of the main body 101 and the conduit clip 402. The foldable conduit clip 402 has several ribs 404 that engage with the securing grooves so that the conduit clip 402 and hence the wiring harness protection system 312 can be easily removed.

FIG. 4B shows a diagram where the wiring harness protection system 312 and the conduit harness system 314 are attached to the main body 101 of the adaptor 100 using the conduit clip 402 of the adaptor 100.

Figure 5:
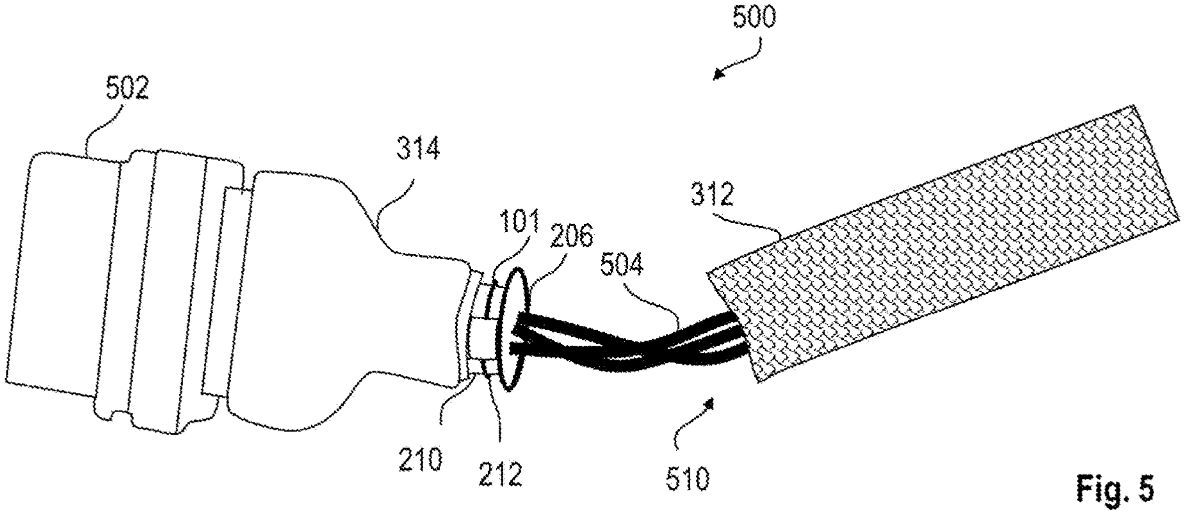
FIG. 5 is a diagram of the wiring harness connection system in accordance with the disclosure.

FIG. 5 shows a diagram of a wiring harness connection system 500 with a wiring harness system 510, the adaptor 100, and the conduit harness system 314. The cable 504 and wiring harness protection system 312 form the wiring harness system 510. The adaptor receives the cable 504 and the wiring harness protection system 312, which has to be pulled over the lip 206, the grooves 210 and the rib 212, before the wiring harness protection system 312 is secured by cable tie 302 or conduit clip 402. The conduit harness system 314 consists of connector 502 and hinged fitting 314. The hinged fitting 314 receives the conduit harness system interface 104 of the adaptor 100, which is not visible in FIG. 5 because it is covered by the closed hinged fitting 314. As can be seen from FIG. 5, the conduit harness system 314 differs from the hinged fitting 314 shown in FIGS. 3A to 4B and has an oblong shape to interface the connector 502. That is, a plurality of different hinged fittings 314 and thus a plurality of different conduit harness systems may be connected to the wiring harness 504, 312.

Figure 6:
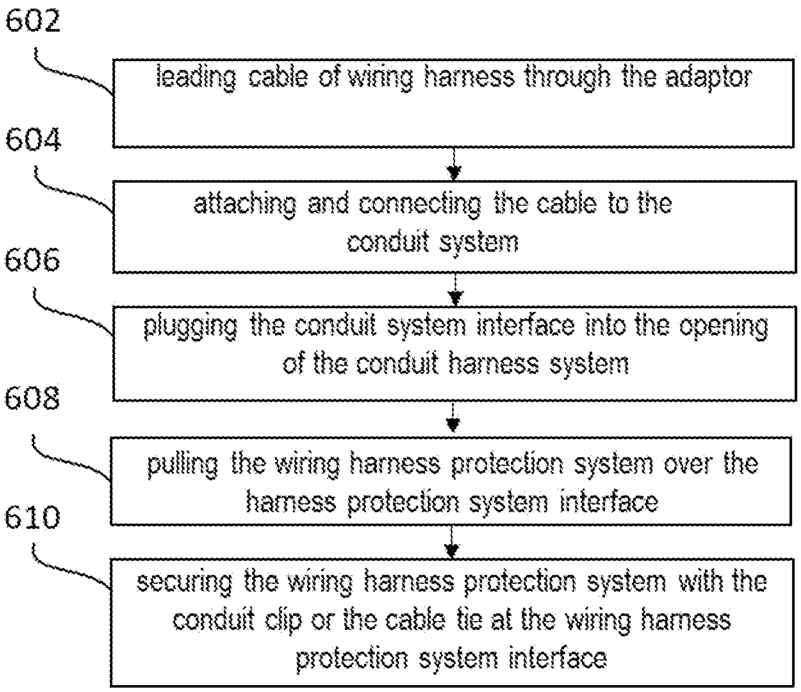
FIG. 6 is a flowchart of a method for connecting, adapting, and securing a harness protection system in accordance with the disclosure.

FIG. 6 shows a flow diagram of the method for connecting, adapting and securing a harness protection system of a wiring harness to a conduit harness system using an adaptor 100 comprising the steps: leading 602 the cable of the wiring harness through the adaptor in direction to the conduit harness system interface, attaching and connecting 604 the cable to the conduit harness system, plugging 606 the conduit harness system interface of the adaptor into the opening of the conduit harness system, pulling 608 the wiring harness protection system over the wiring harness protection system interface of the adaptor, and securing 610 the wiring harness protection system with the conduit clip or the cable tie at the wiring harness protection system interface of the adaptor. The method may comprise further steps and the sequence of the steps may differ.

Figure 7:
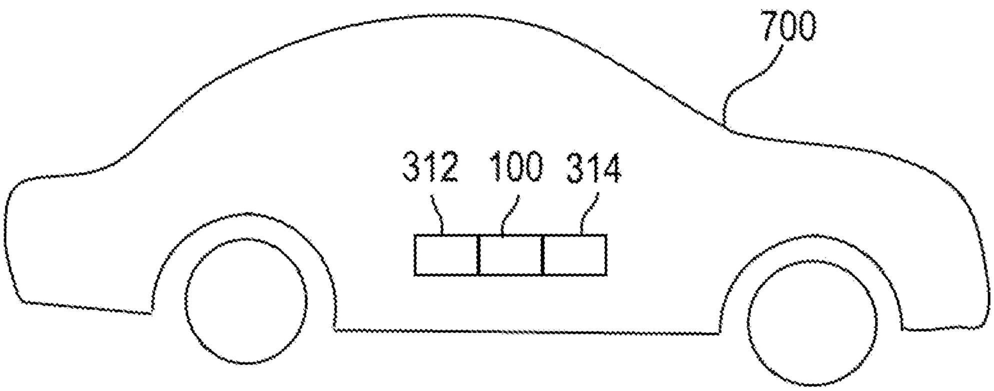
FIG. 7 is a diagram of a vehicle as an example of an industrial product in accordance with the disclosure.

FIG. 7 shows a diagram of a vehicle 700 as an example of an industrial product. The vehicle 700 contains the adaptor 100 to which the wiring harness protection system 312 and the conduit harness system 314 are attached. The conduit harness system 314, the adaptor 100 and the wiring harness protection system 312 are illustrated as blocks.

Other variations to the disclosed embodiments can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

According to an embodiment, the main body is an integral part, wherein the conduit harness system interface and the wiring harness protection system interface have a common central portion. In other words, the main body including the interfaces may be a single device comprising several features to connect, adapt and secure the protection systems.

According to an embodiment, the main body is cylindrical. The cylindrical body may consist of several cylindrical sections. The inner radii of the sections may differ, wherein the transitions may be soft. Further, the thickness of the cylindrical sections may differ and form features such as grooves, ribs or lips as described in more detail below. These features allow, for example, for receiving, and securing the wiring harness protection system and the conduit harness system.

According to an embodiment, the wiring harness protection system interface comprises at least one circumferential groove for receiving a securing device. The at least one circumferential groove serves as part of a fixing and securing mechanism of the wiring harness protection system. For example, the wiring harness protection system, which may consist of, for example, a braiding, mesh or wrap, is pulled over the grooves. The braiding, mesh or wrap, is fixed by a wire, a cable tie, a pipe clamp, a conduit clip, or the like, that is received by the grooves and that clamps the braiding, mesh or wrap.

According to an embodiment, the wiring harness protection system interface comprises two circumferential grooves with a central rib between the circumferential grooves for receiving a securing device. According to embodiments, the adaptor comprises the securing device. The securing device may be a conduit clip, a cable tie, a clamp or a bracket, or similar devices. The securing devices such as cable tie or the conduit clip, etc. are fixing elements separate from the main body of the adaptor and are used to fix the wiring harness protection system to the wiring harness protection system interface. The circumferential grooves of the wiring harness protection system interface receive the cable tie or the ribs of the conduit clip to clamp the braiding, mesh or the wrap of the wiring harness protection system. The reusable conduit clip eliminates the need for tools to loosen and reattach the connection.

The two circumferential grooves with a central rib enhance the fixing and securing of the wiring harness protection system. Further, for example, a foldable conduit clip with ribs that fit into the grooves and which may comprise a snapping mechanism for closing the conduit clip as described herein can be used as fixing element.

According to an embodiment, the wiring harness protection system interface comprises a least one locating feature within the circumferential grooves, wherein the at least one locating feature covers the circumferential grooves.

The locating feature facilitates the use of a cable tie or a conduit clip to secure the wiring harness protection system. In particular, the locating feature may be a location lug to align the conduit clip and provide extra surface area for, e.g., cable tie applications. It may further provide a resistance that impedes that the cable tie or the conduit slip along the grooves when applying a tangential force to fix the cable tie or to close the conduit clip. In case that there are two grooves with a central rib, the at least one locating feature may cover the two grooves and the rib partly. The locating feature may have preferably a rectangular shape or another shape and is bent such that it fits the radius of the grooves. The adaptor may have one or more such locating features. The locating features may be separate parts that are clamped into the grooves and/or onto the central rib between two grooves, or they may be integral with the main body. The groove or the grooves with the rib and the at least one locating feature therefore form a dual function retaining system.

According to an embodiment, the wiring harness protection system interface comprises a front lip. The front lip laterally secures the fastening device used to increase the tensile or pull-off strength of the termination. The front lip forms the circular opening of main body in the direction where the wiring harness protection system is received. The front lip protrudes over the front wall of the front groove, where the front groove is in case of more than one groove the one nearest to the front lip, and the front wall is the wall nearest to the front lip. There may be an intermediate part between the front wall of the front groove and the front lip that adapts the radii of the wall and the front lip, which has an increasing radius toward the front lip such that a smooth transition from the wall to the lip is obtained. That is, the front lip may be designed as a chamfer. The edges of the front lip may be rounded so that the wiring harness protection system can be pulled easily over the front lip without damaging the wiring harness protection system.

According to an embodiment, the conduit harness system interface comprises a circumferential securing groove. The securing groove secures the adaptor within conduit harness system fittings. The conduit harness system may have fittings such as circumferential ribs near the opening interfacing with the main body of the adaptor. The rib nearest to the opening of the conduit harness system engages into the securing groove, and a further rib may rest on the edge of the opening such that these ribs limit the overlapping portion of the conduit harness system and the conduit harness system interface. The overlapping portion of the conduit harness system interface is also referred to as conduit harness system fixing portion in this disclosure. That is, the overlapping part of the conduit harness system encloses the overlapping part of the conduit harness system interface.

According to an embodiment, the conduit harness system interface has a smooth radial outer surface and a smooth internal surface. The smooth radial outer surface with rounded edges guarantees a good fit in the overlapping area of the conduit harness system interface and the conduit harness system and facilitates the reception of the ribs of the conduit harness system. The smooth inner surface guarantees that cables are not damaged and that cables do not stick at the surface.

According to a further aspect, a use of a cable tie or a conduit clip for securing a wiring harness protection system to the main body of the adaptor as described herein is provided.

According to a further aspect, a wiring harness connection system is provided. The system comprises a wiring harness system comprising a cable and a wiring harness protection system, and an adaptor as described herein with a wiring harness protection system interface and a conduit harness system interface, and further comprises a conduit harness system. The adaptor is configured to receive the wiring harness protection system, and the conduit harness system is configured to receive the conduit harness system interface of the adaptor.

The conduit harness system may comprise a connector or other wiring harness components and a hinged fitting or foldable fitting, which can be unfolded to mount the cable to the connector at a connector interface. After the cable has been attached or fixed to the connector, the hinged fitting can be closed providing a protection for the cable and the connector interface. The hinged fitting may serve as a further, i.e., additional adaptor for fitting the adaptor as described herein mechanically, e.g., in terms of dimensions or connector interface characteristics to the connector. There may be a plurality of different such hinged fittings that differ from each other by the interface to the connector, such that a plurality of different types of connectors can be linked to the wiring harness. The hinged fitting may also be designed as, for example, a T-piece or a piece with several junctions to which several protection systems could be connected to the adaptor. For example, the T-piece could have braid conduit and heat shield attached to it.

According to a further aspect, a method for connecting, adapting, and securing a wiring harness protection system of a wiring harness system to a conduit harness system using an adaptor as described herein is provided. The wiring harness comprises a cable and a wiring harness protection system surrounding the cable. The conduit harness system comprises a conduit harness system interface and has an opening for receiving the adaptor and the cable. The method comprises the following steps. In a first step, the cable of the wiring harness system is lead through the adaptor in direction to the conduit harness system. In a second step, the cable is attached and connected to the conduit harness system. In a third step, the conduit harness system interface of the adaptor is plugged into the opening of the conduit harness system. In a fourth step, the wiring harness protection system is pulled over the wiring harness protection system interface of the adaptor, and in a fifth step, the wiring harness protection system is secured with the conduit clip or the cable tie of the adaptor at the wiring harness protection system interface of the adaptor.

After the cable of the wiring harness has been inserted in and lead through the adaptor, the adaptor surrounds the cable and is movable between the cable end and the pulled back harness protection or "cable protection". In the second step, the cable end and hence the cable is attached and connected to the conduit harness system. As described above, the conduit harness system may comprise a connector so that the cable is attached to the connector. An additional fitting, for example, a back shell or hinged fitting may serve for fitting the dimensions and other characteristics of the connector to adaptor. That is, the additional fitting interfaces the connector on one side and the adaptor on the other side. On adaptor-side, the fitting has an opening for receiving the adaptor including the cable. The fitting may have an opening, where the opening is formed by closing the hinged fitting. Therefore, in case of a hinged fitting, the opened hinged fitting is closed such that it encloses the cable and the connector interface, and such that the opening for the adaptor is formed when the two shells are put together. That is, in the third step, the conduit harness system interface of the adaptor is plugged into the opening of the conduit harness system, i.e., the hinged fitting, wherein the term "plugging" may also have the meaning putting the adaptor into the half shell of a hinged fitting and closing the hinged fitting. In the fourth step, the wiring harness protection system, which is still pulled back, is now pulled over the wiring harness protection system interface of the adaptor, so that the wiring harness protection system is attached to the adaptor and covers the cable and the wiring harness protection system interface of the adaptor. Finally, in the fifth step, the wiring harness protection system is secured with the conduit clip or the cable tie at the wiring harness protection system interface of the adaptor. Parts of the sequence may be interchanged.

According to a further aspect, an industrial product comprising a wiring harness connection system as described herein is provided. The industrial product is, for example, a vehicle, a robot or a machine.

The adaptor and the wiring harness connection system can be integrated in any industrial product where a wiring harness and a conduit harness system may be connected with each other.

The embodiments in accordance with the present disclosure solve the need to terminate one form of cable protection before starting another. This increase in protection reduces the risk of damage to the wiring harness system. It is able to link two protection systems, enhancing the protection performance of both systems. The adaptor may provide features that are matched to the characteristics of the conduit harness system. This enhances the conduit harness system's ability to protect cables by connecting it to an additional range of conduit protection systems. The wiring harness protection system interface retains the various types of wire harness protection systems, which is achieved, for example, through the dual function retention system. The primary function of the adaptor is to accommodate a wide range of systems and the integration of the conduit clips for the ability to be a reusable system and therefore to provide a solution for connecting different cable protection systems together, which means complete protection for the wiring system.

These and other features, aspects and advantages of the present invention will become better understood with reference to the accompanying figures and the following description.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B")

is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE NUMERALS

100 adaptor
101 main body
102 second portion of main body, wiring harness protection system interface
102' part of the wiring harness protection system interface
103 common central portion of the wiring harness protection system interface and the conduit harness system interface
104 first portion of main body, conduit harness system interface
104' part of the conduit harness system interface
105 conduit harness system fixing portion of the conduit harness system interface
106 transition point between two cylindrical sections with different inner diameters
202' part of the wiring harness protection system interface
204' part of the conduit harness system interface
206 front lip
208 Dual Function Retention System
210 grooves in the wiring harness protection system interface
212 central rib in the groove in the wiring harness protection system interface
214 locating features
216 securing groove
218 smooth radial outer surface
219 conduit harness system receiving portion
220 smooth internal surface
302 cable tie
312 wiring harness protection system
314 hinged fitting, conduit harness system
316 securing rib
317 securing rib
318 clip mechanism of the conduit harness system
402 conduit clip
404 ribs of the conduit clip
500 wiring harness connection system
510 wiring harness system
502 connector
504 cable
602 first method step
604 second method step
606 third method step
608 fourth method step
610 fifth method step
700 industrial product, vehicle

What is claimed is:

1. An adaptor for connecting, adapting and securing different harness protection systems, comprising:

a main body including a first portion, wherein the first portion is a conduit harness system interface configured to be connected to a conduit harness system, and a second portion, wherein the second portion is a wiring harness protection system interface configured to be connected to a wiring harness protection system;

wherein the main body includes a common central portion connecting the first portion and the second portion, wherein the conduit harness system interface includes a conduit harness system receiving portion forming a conduit harness system fixing portion, the conduit harness system receiving portion having a smooth radial outer surface and a smooth internal surface, wherein the conduit harness system interface comprises a circumferential securing groove positioned between the conduit harness system receiving portion and the common central portion, and wherein the wiring harness protection system interface comprises two circumferential grooves with a central rib between the two circumferential grooves for receiving the securing element; and the securing element separate from the main body and mounted externally around the wiring harness protection system interface, wherein the securing element is a cable tie or a conduit clip configured to clamp the wiring harness protection system to the wiring harness protection system interface by engaging at least one of the two circumferential grooves or the central rib.

2. The adaptor according to claim 1, wherein the main body is an integral part.

3. The adaptor according to claim 1, wherein the main body is cylindrical.

4. The adaptor according to claim 1, wherein the wiring harness protection system interface comprises a front lip protruding over a front wall of a front groove, wherein the front groove is a one of the two circumferential grooves nearest to the front lip.

5. The adaptor according to claim 1, wherein the wiring harness protection system interface comprises at least one locating feature within at least one of the two circumferential grooves, wherein the at least one locating feature covers the two circumferential grooves and at least partially covers the central rib.

6. The adaptor according to claim 1, wherein the securing element is a conduit clip.

7. The adaptor according to claim 6, wherein the conduit clip has several ribs that engage with the two circumferential grooves, and wherein the conduit clip is reusable.

8. The adaptor according to claim 5, wherein the locating feature is a location lug to align a conduit clip and provide extra surface area for cable tie applications.

9. The adaptor according to claim 4, wherein edges of the front lip are rounded so that the wiring harness protection system can be pulled over the front lip without damaging the wiring harness protection system.

10. The adaptor according to claim 1, wherein the circumferential securing groove is configured to receive a securing rib of the conduit harness system.

11. The adaptor according to claim 1, wherein the smooth radial outer surface has rounded edges.

12. A wiring harness connection system, comprising:

a wiring harness system comprising a cable and a wiring harness protection system;

an adaptor having a main body, the main body forming a wiring harness protection system interface and a conduit harness system interface, wherein the main body includes a common central portion connecting the conduit harness system interface and the wiring harness protection system interface, wherein the conduit harness system interface includes a conduit harness system receiving portion forming a conduit harness system fixing portion, the conduit harness system receiving portion having a smooth radial outer surface and a smooth internal surface and a circumferential securing groove positioned between the conduit harness system receiving portion and the common central portion, wherein the wiring harness protection system interface comprises two circumferential grooves with a central rib between the two circumferential grooves for receiving the securing element, and wherein the adaptor is configured to receive the wiring harness protection system at the wiring harness protection system interface;

the securing element separate from the main body and mounted externally around the wiring harness protection system interface, wherein the securing element is a cable tie or a conduit clip configured to clamp the wiring harness protection system to the wiring harness protection system interface by engaging at least one of the two circumferential grooves or the central rib; and a conduit harness system configured to receive the conduit harness system interface of the adaptor.

13. A method for connecting, adapting and securing a wiring harness system to a conduit harness system, comprising:

providing an adaptor, the adaptor having a main body including a first portion, wherein the first portion is a conduit harness system interface configured to be connected to a conduit harness system, and a second portion, wherein the second portion is a wiring harness protection system interface configured to be connected to a wiring harness protection system;

wherein the main body includes a common central portion connecting the conduit harness system interface and the wiring harness protection system interface, wherein the conduit harness system interface includes a conduit harness system receiving portion forming a conduit harness system fixing portion, the conduit harness system receiving portion having a smooth radial outer surface and a smooth internal surface and a circumferential securing groove positioned between the conduit harness system receiving portion and the common central portion, wherein the wiring harness protection system interface comprises two circumferential grooves with a central rib between the two circumferential grooves for receiving the securing element;

providing the wiring harness system, the wiring harness system comprising a cable and a wiring harness protection system surrounding the cable, wherein the conduit harness system comprises an conduit harness system interface and forms an opening for receiving the adaptor and the cable;

providing the securing element separate from the main body and mounted externally around the wiring harness protection system interface, wherein the securing element is a cable tie or a conduit clip configured to clamp the wiring harness protection system to the wiring harness protection system interface by engaging at least one of the two circumferential grooves or the central rib;

leading the cable of the wiring harness system through the adaptor in direction to the conduit harness system;

attaching and connecting the cable to the conduit harness system;

plugging the conduit harness system interface of the adaptor into the opening of the conduit harness system;

pulling the wiring harness protection system over the wiring harness protection system interface of the adaptor; and securing the wiring harness protection system with the securing element at the wiring harness protection system interface of the adaptor.

* * * * *